March 3, 1964

I. H. WAHLBECK ETAL 3,123,794

VARIABLE ELECTRICAL RESISTANCE MECHANISM

Filed April 25, 1958

Inventors:
Stuart G. Miller,
Ira H. Wahlbeck,
by Roe DMcBurnett
Their Attorney.

March 3, 1964 — I. H. WAHLBECK ETAL — 3,123,794
VARIABLE ELECTRICAL RESISTANCE MECHANISM
Filed April 25, 1958 — 2 Sheets-Sheet 2
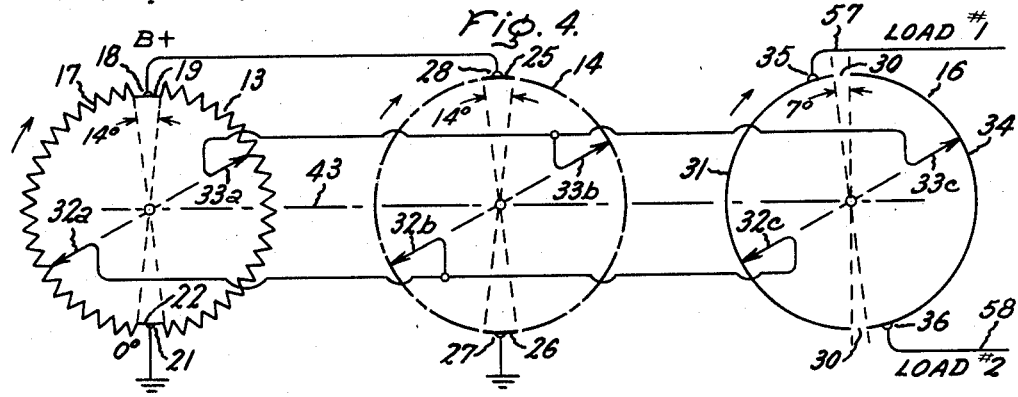
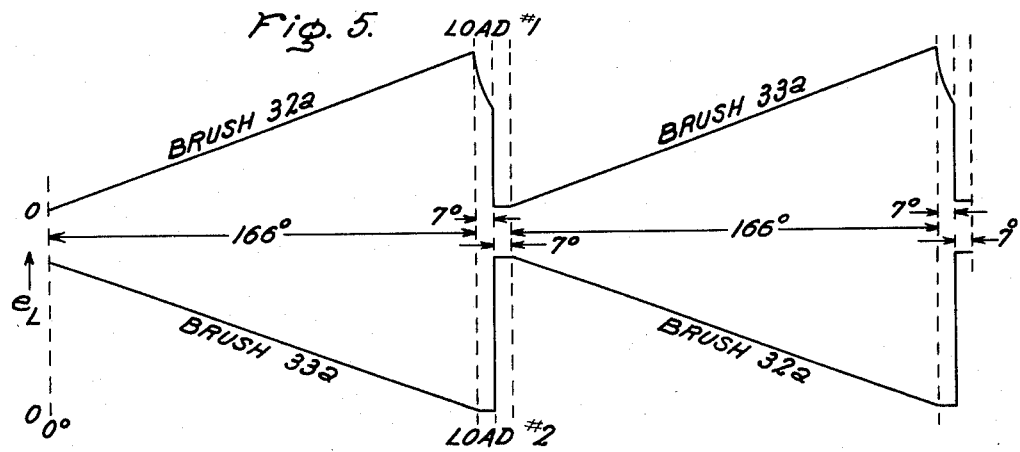
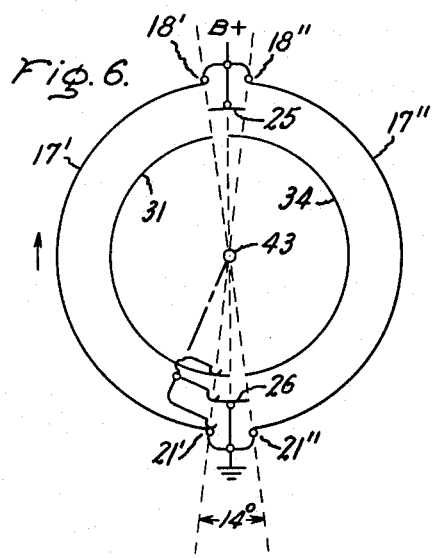
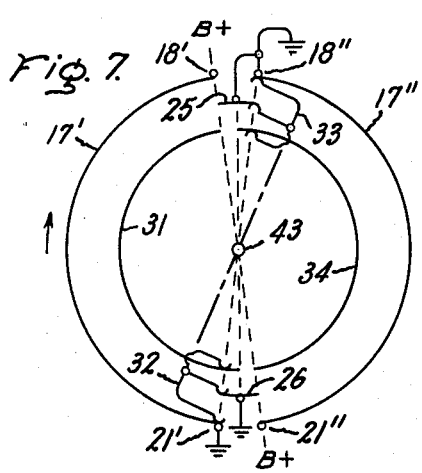
Inventors:
Stuart G. Miller,
Ira H. Wahlbeck,
by Roe D. McBurnett
Their Attorney.

United States Patent Office 3,123,794
Patented Mar. 3, 1964

3,123,794
VARIABLE ELECTRICAL RESISTANCE
MECHANISM
Ira H. Wahlbeck, Whitesboro, and Stuart G. Miller, Utica, N.Y., assignors to General Electric Company, a corporation of New York
Filed Apr. 25, 1958, Ser. No. 730,917
4 Claims. (Cl. 338—172)

The present invention relates to variable electrical resistance mechanisms and, more particularly, to potentiometers having a protective mechanism for minimizing burning of the resistive element of the potentiometer caused by transient currents fed back from a load to the resistive element of the potentiometer.

Potentiometers of the type with which the present invention is particularly, though no texclusively, concerned, are utilized in systems including capacitance which may be the capacitance inherent in circuits including long electrical leads or may be in the form of capacitors included in the load circuit. In either type load, the capacitive portion of the load is rapidly charged and/or discharged through a resistive element of the potentiometer. In such systems, the transient surges of current through the resistive element at the time of rapid change in the condition of the capacitive load, produce burning of the potentiometer resistor, and therefore materially shorten the life of the resistive element. Specifically, a capacitive load and a potentiometer may be employed in a system for producing a sawtooth voltage wave, in which case the load is connected to a potentiometer brush, adapted to move across the surface of the resistive element, in order to gradually increase or decrease, as desired, the voltage applied to the capacitive load as the brush moves relative to the point of connection between the potentiometer resistor and in a source of potential. Generation of a cyclic sawtooth wave requires that at the end of each wave form, the capacitive load either be rapidly charged or discharged, and this charging or discharging has, in accordance with the prior art, taken place through the potentiometer's resistive element. The contact between the potentiometer brush and the resistive element of the potentiometer is necessarily a relatively high resistance contact due to the nature of the resistive material. The sudden surge of current required to charge or discharge the capacitive load takes place through the high resistance contact between the resistive element and the brush and produces burning of both elements. Such operation obviously materially shortens the life of the potentiometer and adds to the cost of maintenance and repair of circuits utilizing these systems.

It is, therefore, an object of the present invention to provide a variable potentiometer mechanism including elements for protecting the potentiometer resistance from transient switching currents occurring in consequencee of the rapid and cyclic charge and/or discharge of associated circuit components.

It is another object of the present invention to provide a function generator utilizing a potentiometer and a capacitive load, and including protective elements which provide a by-pass around the potentiometer resistance during intervals of rapid charge and/or discharge of the capacitive load.

In accordance with the broad aspects of the present invention, a resistive element of a potentiometer is adapted to be connected across a source of potential and a movable brush of the potentiometer is connected to a capacitive load. As the brush is moved over the resistive element, the voltage across the capacitive load increases or decreases, depending upon the direction of movement of the brush, until the voltage reaches a maximum or minimum value as the brush obtains a position adjacent one of the connections between the resistive element and the source of voltage. Assuming that the resistive element is discontinuous, the brush immediately thereafter contacts the other end of the resistive element and the voltage across the capacitive load changes suddenly.

In consequence, there must be a rapid charge or discharge of the load through the brush and the end of the resistive element connected to the high or low voltage terminal, respectively, or the voltage source. Since the contact resistance between the brush and the resistive element is quite high, the surge of current produced by charge or discharge of the capacitive load produces burning of both the brush and the resistive element and materially reduces the life of the apparatus.

The potentiometer and capacitive load arrangement described above is not the only arrangement from which burning of the potentiometer may result. Specifically, even though the resistive element is continuous, burning may be effected by transient currents in consequence of switching loads to which the resistive element is connected. More specifically, two sets of brushes may be employed, with one set of brushes connected via one electrical portion of a single discontinuous slip-ring to a first load and with the other set of brushes connected via another electrical portion of the slip-ring to another load. The slip-ring is discontinuous so that the movement of the mechanism throughout its complete cycle of movement causes each brush to alternately be connected to a different one of the loads through a different portion of the slip-ring. If each brush of the potentiometer is connected via a slip-ring to a capacitive load having a voltage which is considerably different from the voltage of that segment of the resistive element with which the brush is in contact, the capacitive load again rapidly charges or discharges through the resistive element and produces burning.

In accordance with one embodiment of the present invention, there is provided a conductive segment and means for connecting it in circuit with a resistive element at the moment the capacitive load is to be charged or discharged, or immediately preceding its charge or discharge in a normal cycle of operation, so that the current surge proceeds through the short conductive element and its associated brush, thereby effectively shunting the resistive element and its brush at the time of charge or discharge of the capacitive load. Since the brush and the short conductive element, which provide the aforesaid shunting effect, are fabricated from relatively highly conductive material, there contact resistance is relatively low and burning is minimal. The present invention, in its physical aspects, may take several forms, but in a preferred form of the invention, the resistive element, the slip-ring for switching between loads and the short conductive element or elements are each positioned on the inner circumference of a different annulus, the annuli having substantially identical inner and outer diameters and being axially aligned. The resistive element and the slip-ring and the short conductive elements may be placed on the inner circumference of the annuli fabricated from insulating material such as Bakelite. The brushes for contacting the various elements are secured to a non-conductive member supported on a rotatable shaft so that the brushes are maintained in alignment with respect to one another and moved over the surfaces of their respective elements by a single mechanism including the non-conductive member and the rotatable shaft. The various annuli are provided with terminals which extend therethrough and into contact with the conductive and resistive elements as the case may be, these terminals being adapted for external connection and interconnection between one another. The short conductive element is arranged with respect to the resistive element such that it is in angular alignment with that portion of the resistive element which would otherwise take the sudden charge or discharge of the capacitive or other storage load. As will become apparent upon a detailed discussion of the apparatus the resistive elements may be continuous or discontinuous as may the slip-ring or rings; the specific arrangement of these elements being determined by the particular system in which the potentiometer device is to be employed.

It is another object of the invention to provide a potentiometer mechanism which may accept rapid charge or discharge of a capacitive or other storage load therethrough without having excessive currents directed through the resistive element of the potentiometer.

It is yet another object of the present invention to provide a function generator utilizing a potentiometer device for supplying a capacitive load which device provides an electrical shunt around a resistive element of the potentiometric device during intervals of rapid charge or discharge of the capacitive load.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a schematic wiring diagram illustrating an electric circuit incorporating one embodiment of the apparatus of the present invention;

FIGURE 4 is an electrical circuit diagram showing the electrical connections and physical relationship between the elements of the FIGURE 3 apparatus used for supplying two distinct loads;

FIGURE 5 is a graph illustrating the relationship between the voltages across the two loads of FIGURE 4 as a function of the degree of rotation of the center shaft of the potentiometer device of the invention;

FIGURE 6 is a schematic electrical and mechanical diagram of still another embodiment of the invention for providing a plurality of loads; and FIGURE 7 is a schematic diagram of the interconnections and arrangements, respectively, of the elements of a still further embodiment of the invention for supplying a plurality of loads.

Figure 1:
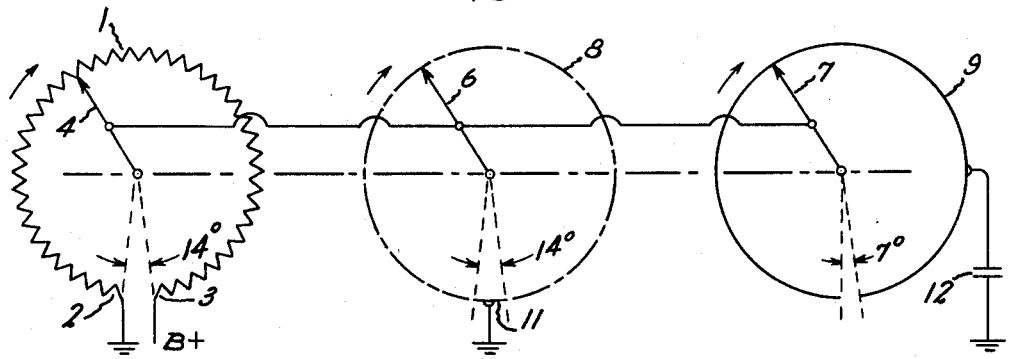

Referring specifically to FIGURE 1 of the accompanying drawings there is illustrated a circular resistance 1 which may be a slide wire resistor or a film resistor. The circular resistive element 1 has a discontinuity therein which for the purposes of illustration is assumed to be 14° of the circle subtended by the resistive element 1. The discontinuity in the resistive element 1 may constitute an air gap or a piece of insulating material. One end of the resistive element 1, designated by the reference numeral 2, is connected to a source of reference potential, hereinafter referred to as ground for purposes of explanation only, while the other end of the resistive element 1, designated by the reference numeral 3, is connected to a source of voltage which may be positive or negative and is specifically illustrated as a positive voltage source. Thus the resistive element, when connected as described, has points thereon which are at different potentials with respect to each other. The resistor 1 is adapted to be contacted by a rotatable brush 4 which may be caused to rotate through a complete circle over the surface of the resistor 1 and through the 14° region of the discontinuity therein. The brush 4 is electrically and physically connected to two further brushes 6 and 7, the brush 6 being adapted to contact an annulus 8 and the brush 7 being adapted to contact an annulus 9. The physical connection between the brushes 4, 6 and 7 in the embodiment of the invention illustrated in FIGURE 1 is such that the brushes assume the same position in space at all times although such an arrangement is not necessary and it is not intended to limit the invention to the specific arrangement illustrated. The annulus 8 is of non-conductive material and has a conductive segment 11 of 14° angularly aligned with the 14° discontinuity in the resistive element 1. The annulus 9 is fabricated from conductive material and has a 7° discontinuity therein which is angularly aligned with a portion of the 14° discontinuity in the resistive element 1. The precise segment of the element 1 with which the 7° discontinuity in the annulus 9 is aligned is determined by the direction of rotation of the brushes 4, 6 and 7 and is aligned with that half of the 14° non-conductive segment in the element 1 that constitutes the first half of the segment as determined by the direction of rotation of the brushes. To complete the circuit the conductive segment of the annulus 8 is connected to ground while the conductive annulus 9 is connected to ground through a capacitive load representative schematically as a capacitor 12.

Figure 2A:
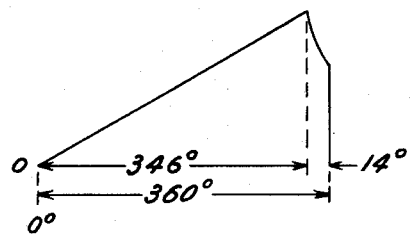
FIGURES 2a and 2b are graphs illustrating the interrelationship between the angle of rotation of the brush of a potentiometric device and the voltage across the load in accordance with the prior art systems and the system of the present invention, respectively.

Proceeding now with the description of the operation of the apparatus of FIGURE 1 and assuming initially that the annulus 8 is eliminated from the circuit, and that brushes 4 and 7 are electrically and physically connected, reference is made to FIGURE 2a which is a graph of the voltage across the capacitive load 12 as a function of the position of the brushes 4 and 7. Assuming that at the start of operation the brush 4 is in contact with the resistance 1 adjacent its terminal 2, the voltage on the brush, and therefore, the voltage on the upper plate of the capacitor 12 is at ground potential as illustrated in FIGURE 2a at zero degrees. Assuming that the resistance 1 is a linear resistance, as the brush 4 is rotated clockwise, the voltage on the brush 4 and therefore the voltage across the capacitor 12 increases linearly until the brush 4 is adjacent the terminal 3 of the resistive element 1 at which time the voltage on the brush 4 and the voltage across the capacitive load 12 are equal to the voltage of the voltage source connected to the terminal 3. Since the resistor 1 has 14° discontinuity therein, the voltage on the brush 4 reaches a maximum after it has been rotated through 346°, this being indicated in FIGURE 2a. Still assuming that the annulus 8 is eliminated from the circuit of FIGURE 1, continued rotation of the mechanism causes the brush 4 to enter the discontinuity in the resistance 1 and for the brush 7 to enter the discontinuity in the annulus 9. The load, since it is now disconnected from the voltage source, discharges through its load at a rate determined by the time constant of the capacitance of the load circuit until the brush 4 contacts the resistance 1 adjacent its terminal 2. Contact of the brush 4 with the resistance 1 immediately connects the upper plate of the capacitor 12 to ground potential and produces a sudden discharge of the capacitor through the brush 4 and the resistance 1. The sudden surge of current, which, if the voltage remaining in the load circuit is high, is quite considerable, produces burning of the resistive element and after prolonged periods of use the element 1 is destroyed.

Figure 2B:
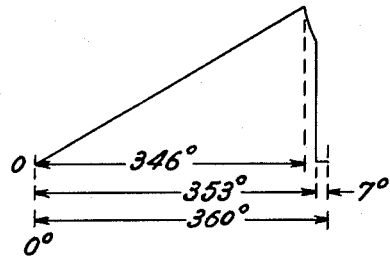

As previously indicated, the difficulties encountered with the circuit described in the preceding paragraph may be substantially eliminated by the apparatus of the present invention which includes the annulus 8 with its conductive segment 11. Referring now to the voltage diagram of FIGURE 2b of the accompanying drawings, the operation of the circuit is substantially identical as that described in the preceding paragraph through the first 353° of rotation of the brush 4, which carries the brush 7 through the 7° discontinuity of the annulus 9. Through the first 346° of rotation of the apparatus, the brush 6 has contacted insulating material. From 346° through 353° of the cycle of rotation of the brushes, the brush 6 is connected to the grounded segment 11, but is not otherwise connected since the brushes 4 and 7 are adjacent air gaps or resistive material. However, through the last 7° of rotation of the brushes, the brush 7 contacts the annulus 9 while the brush 6 is in contact with the segment 11. Therefore, the capacitive load 12 is now grounded through the brush 6 and the conductive segment 11 while, in the embodiment of FIGURE 1, the brush 4 is out of contact with the resistive element although as is indicated subsequently this is not essential to the functioning of the apparatus. In consequence of the fact that the capacitive load 12 is now shunted to ground through a substantial short circuit, the discharge is almost instantaneous and since the contact resistance between the conductive brush 6 and the conductive segment 11 is relatively low, a minimal amount of burning takes place at the point of contact between the brush and the segment 11. Further, since the discharge of the capacitive load 12 may be safely effected at any time that the brush 6 is in contact with any portion of the last 7° of the segment 11, that is, the arc from 353° to 360° of the annulus 8, the device remains operative until the entire 7° segment is destroyed by burning which does not normally occur during the expected life of the resistive element 1.

Figure 3:
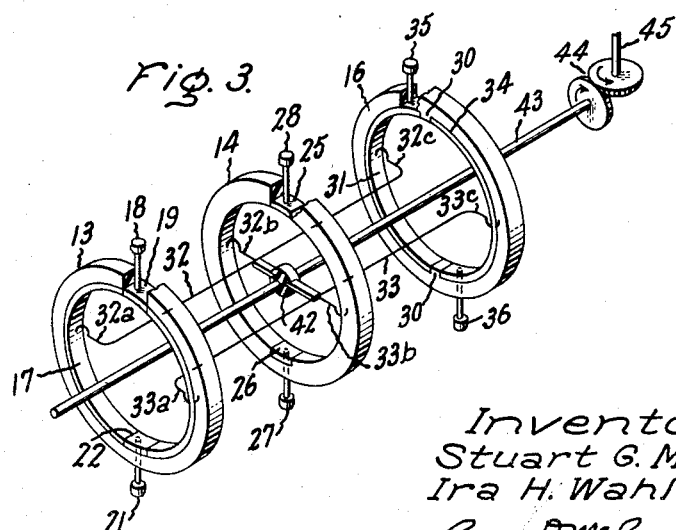
FIGURE 3 is an exploded perspective view illustrating the elements of another embodiment of the apparatus of the present invention aligned along the axis of the apparatus.

Referring now to FIGURES 3, 4 and 5 of the accompanying drawing there is illustrated a specific physical embodiment of the apparatus of the present invention, an electrical schematic diagram of its connection and a graphical presentation of its operation. The potentiometric apparatus includes three annuli, 13, 14 and 16, each fabricated from a non-conductive material such as Bakelite. The annulus 13 is provided on its inner circumferential surface with electrical resistive material 17 which may be continuous or discontinuous depending upon the particular embodiment of the invention of interest. A conductive metal stud 18 forms a terminal post for the resistive element 17 and extends through the wall of the annulus 13 into contact with an arcuate conductive segment 19. Similarly, a terminal 21, diametrically opposed to the terminal 18, extends through the annulus 13 and into contact with an arcuate conductive segment 22. The conductive segments 19 and 22 each occupy 14° of the circumference of the resistance element 17, and are utilized in order to establish a good electrical contact between the terminals and the resistance element. However, it is not intended to limit the invention to the utilization of these arcuate conductive segments 19 and 22 and the electrical operation of the apparatus is substantially unaffected by their inclusion or exclusion.

The annulus 14 is provided on its inner circumference with conductive segments 25 and 26 separated by non-conductive segments formed by portions of the annulus 14. One of the conductive segments 26 is in contact with a conductive terminal 27 extending through the annulus 14. In the embodiment of the invention illustrated in FIGURE 3 the annulus 14 is provided with a second conductive terminal 28 extending through the annulus 14 and into contact with an arcuate conductor 25 which is diametrically opposed to the conductor 26 and of the same length, which for the purposes of illustration is taken to be 14°. The surface of the annulus 14 other than segments 25 and 26 is of non-conductive material as previously noted.

The annulus 16 is provided on its inner surface with a conductive element which is divided by two diametrically opposed non-conductive segments 30 into two arcuate conductors 31 and 34. For the purposes of illustration, the non-conductive segments 30 are considered to subtend angles of 7° each. The conductive segments 31 and 34 are adapted to be contacted by two diametrically opposed terminals 35 and 36 which extend through the wall of the annulus 16 and into contact with segments 31 and 34.

In the embodiment of the invention illustrated in FIGURE 3, the apparatus is provided with two sets of brushes 32 and 33 secured to a cylindrical insulating member 42. The cylindrical member 42 is mounted on a rotatable shaft 43 which may be connected, as for example through gearing 44 to an antenna shaft 45 in order to produce rotation of the shaft 43. The brush set 33 comprises three resiliently mounted brushes 33a, 33b and 33c secured to the insulating member 42. The brushes 33a, 33b and 33c are preferably arranged to have a spacing therebetween equal to the spacing between the center lines of the inner circumferential surfaces of the annuli 13, 14 and 16 and to contact these inner surfaces when they are assembled. The brush set 32 is also provided with three brushes 32a, 32b and 32c extending in an opposite direction from the brushes 33a, 33b and 33c both sets of brushes are mounted so that they contact the inner surfaces of the annuli 13, 14 and 16 at diametrically opposed locations.

When the apparatus is assembled, the annuli 13, 14 and 16 are interposed with air space or insulation between them so that the conductive segments of each annuli are not in contact with one another and the insulating member 42 and shaft 43 are positioned axially of the annuli so that the brushes of the brush sets 32 and 33 contact the inner surfaces of the annuli as indicated above. The annuli 13, 14 and 16 may then be mounted in a suitable housing, not shown.

The schematic circuit diagram of the apparatus illustrated in FIGURE 3 of the accompanying drawings is shown in FIGURE 4. In FIGURE 4 the terminals 18 and 28 of the annuli 13 and 14, respectively, are connected to a source of positive voltage while the terminals 21 and 27 of the annuli 13 and 14 are connected to a point of reference potential such as ground. The terminal 35 of the annulus 16 is connected to a first lead 57, connected to a load circuit (not illustrated) designated load No. 1 and the terminal 36 is connected to a second lead 58 connected to a load circuit, designated load No. 2. Considering the operation of the system and apparatus illustrated in FIGURES 3 and 4, and initially assuming that the brushes 32a and 33a are diametrically opposed and are adjacent the terminals 21 and 18, respectively, and that the brushes are rotated clockwise, the brush 32a contacts a region of zero potential on the conductive segment 22 of the resistive element 17 while the brush 33a contacts a region of maximum potential on the conductive segment 19 of the resistive element 17. In this initial position, the brush 32b is grounded while the brush 33b is connected directly to the high voltage source. The brush 32c is in contact with the arcuate conductive segment 31 and therefore, connected to a load No. 1 while the brush 33c is in contact with the conductive segment 34 of the annulus 16 and, therefore, is connected to load No. 2.

Referring now to the voltage graphs of FIGURE 5, the aforesaid positions of the elements are indicated by the zero degree position on the graphs. As the shaft 43 is rotated so as to rotate the brushes clockwise, the voltage on the brush 32a and therefore across the load No. 1 rises gradually until after 166° of rotation of the brush it becomes aligned with the segment 19 and a maximum voltage is applied to this brush and to load No. 1. Concurrently, the voltage on the brush 33a and therefore the voltage across load No. 2 decreases through the first 166° of rotation of the shaft 43 until the segment 22 is contacted and ground potential is obtained. At this same position of the shaft 43, the brush 32b contacts the segment 25 of the annulus 14 while the brush 33b contacts the conductive segment 26. Concurrently, the brush 32c is positioned between the conductive segment 31 and 34 as is the brush 33c so that the loads are disconnected from the resistive element 17 and the conductive segments 25 and 26. The capacitive load No. 1 gradually discharges during the period required for the shaft 43 to rotate an additional 7°, while the load No. 2 being fully discharged remains at ground potential during this 7° interval. During the next 7° interval of rotation of the shaft 43, the brushes 32b and 33b remain in contact with the segments 25 and 26, respectively, while the brushes 32c and 33c contact the segments 35 and 31, respectively, of the annulus 16. In consequence, the load No. 1 is connected via the brushes 33b and 33c to ground potential and the undischarged potential present in the load is immediately discharged to ground through the brushes and the segment 26. Concurrently, the load No. 2 is charged to the potential of the positive source through brushes 32c and 32b and the segment 25. At the end of this second 7° of rotation of the shaft 43, the brushes 32b and 33b move out of contact with the segments 25 and 26, and, the voltage fall in load No. 2 and voltage rise in load No. 1 commences.

It will be noted that during the portion of the rotation cycle at which the capacitive loads are charged and discharged, the resistive element 17 is effectively shunted by the brushes of the brush sets 32 and 33 and the conductive segments 25 and 26 of the annulus 14. Therefore, large surge currents are diverted around the resistive element 17 and burning of this element is substantially reduced or eliminated. In the apparatus illustrated in FIGURES 3 and 4 of the accompanying drawings, the resistive element 17 is continuous but it is not intended to limit the structure of the present invention to a continuous resistive element where two distinct loads are being supplied.

Reference is now made to FIGURE 6 of the accompanying drawings, which schematically illustrates a potentiometer which produces identical results with that illustrated in FIGURES 3 and 4. In this arrangement, in which the elements are illustrated as concentric or concentric portions of concentric circles, the outer discontinuous circle represents the resistive element and constitutes elements 17' and 17'' each of approximately 166° with equal 14° spacings therebetween. The resistive members 17' and 17'' are each provided with two terminals 18' and 21' and 18'' and 21'', respectively. The conductive segments 25 and 26 are identical with those illustrated in FIGURE 4 and occupy diametrically opposed locations between the ends of the resistive strips 17' and 17''. The conductive contacts 31 and 34 are identical with those illustrated in FIGURES 3 and 4 and occupy identical positions relative to the conductive segments 25 and 26 as in the prior figures. The operation of this embodiment of the invention is precisely the same as that illustrated in FIGURE 4 since in FIGURE 4 although the resistive element 17 is continuous, the portions of that element subsisting within the 14° arcs defined by the segments 25 and 26 are effectively short-circuited. In FIGURE 6 by connecting the terminals 18' and 18'' to the source of voltage and to the conductor 25 and by connecting the terminals 21' and 21'' to ground potential and to the conductor 26 precisely the same effect is obtained as is obtained when the resistive portions of FIGURE 4 are shunted by the conductive segments 25 and 26. It will be noted that in the embodiment of the invention illustrated in FIGURE 4 of the accompanying drawings, the voltage wave forms developed across the loads No. 1 and No. 2 are 180° out of phase, that is, the voltage across the load No. 1 rises slowly from ground potential to a maximum potential whereas the voltage across the load No. 2 falls slowly from a maximum potential toward ground potential. Due to the flexibility of a potentiometer employing two discontinuous resistive elements, two in-phase voltage wave forms may be developed across the load elements and such an apparatus is illustrated in FIGURE 7 of the accompanying drawings.

Referring specifically to FIGURE 7 which is a diagram of the type utilized in FIGURE 6, the terminal 18' of the resistive element 17' is connected to a source of high voltage while the terminal 21' is connected to ground, this being the same as in FIGURE 6. However, the conductive element 25 is grounded while the terminal 21'' of the element 17'' is connected to a source of high voltage so that the connections of the resistive element 17'' are reversed with respect to the connections illustrated in FIGURE 6. The element 26 is connected to ground potential as in FIGURE 6. It will be seen that in the embodiment illustrated in FIGURE 7 both brush sets 33 and 32 are subject to gradually increasing voltages and at the end of each half cycle of rotation of the shaft are subject to suddenly reduced voltages. Therefore, the wave forms generated across both sets of brushes 32 and 33 in the embodiment illustrated in FIGURE 7 are sawtooth waves having gradually increasing voltages from ground potential to a maximum potential. Alternatively, by reversing the terminal connections or by reversing the direction of rotation of the brushes, adjusting the phase relationship between the conductive segments 25 and 26 and the non-conductive portions of the slip-ring, and making the necessary wiring change, the phase of both of the voltage wave forms may be reversed and will conform to that across load No. 2 of FIGURES 4 and 5.

Although various specific embodiments of the invention have been illustrated, it is apparent that a number of modifications may be made therein. Thus, the general arrangement illustrated in FIGURES 4, 6 and 7 may be readily modified to supply three, four or any larger number of distinct loads, within reason, by simply providing shorter segments and additional terminals on the annuli 13, 14 and 16. It will be appreciated that in FIGURE 3 of the accompanying drawings, a number of additional segments may be provided on the annulus 14 so that if necessary or desirable additional terminals may be added to provide additional active segments. Also, additional terminals may be applied to the annulus 16 at the time of manufacture so that all that would be required to convert the system to a multi-load system would be to score the conductive segments in order to sub-divide the segments into additional distinct conductive elements. Also the invention is not to be construed as limited to use with sawtooth wave forms but may be used in systems wherein other wave forms, e.g., sine and cosine functions are generated.

It will be appreciated that regardless of the number of distinct loads which may be supplied, the principle of operation of the present invention is the same and specifically relates to the utilization of a highly conductive member either shunting a portion of the resistive element or subsisting in the region of discontinuities in the resistive element, which conductive segment or segments connect with brushes mechanically synchronized with movement of the brush on the resistive element, so that at the time a sudden surge of current is expected from a load, the shunting conductive element is in circuit and takes the surge current so as to divert it from the resistive element and prevent burning thereof.

While we have described and illustrated one specific embodiment of our invention, it will be clear that variations of the details of construction which are specifically illustrated and described may be resorted to without departing from the true spirit and scope of the invention as defined in the appended claims.

What is claimed is:

1. A variable arcuate electrical resistance mechanism comprising an arcuate discontinuous resistive element, a first movable and conductive brush contacting said resistive element, a first arcuate discontinuous conductive element, a second movable and conductive brush contacting said conductive element, a stationary discontinuous arcuate conductive element, a third movable and conductive brush contacting said discontinuous conductive element, means for electrically connecting said brushes and mechanical means for maintaining said brushes mechanically positioned with respect to one another such that upon movement of said brushes over their respective elements, said conductive element and said stationary discontinuous conductive element are electrically connected substantially only when said first brush is out of contact with said resistive element and said first conductive element is electrically connected to said resistive element substantially whenever said first brush is contacting said resistive element, the arcuate lengths of the discontinuity of said resistive element and said stationary conductive element being approximately twice that of said first conductive element, the arcuate length of the discontinuity of said first conductive element being in excess of five degrees, and means to selectively connect the stationary conductive element in circuit with the adjacent ends of said discontinuous resistive element, whereby the relative phasing of signals which can be provided by said mechanism can be selectively controlled.

2. A variable electrical resistance mechanism comprising a first, a second and a third non-conductive annulus all of approximately the same diameter, means for maintaining said annuli in fixed positions relative to one another along a common axis, said first annulus having a resistive element on its inner circumference, said second annulus having a stationary discontinuous conductive element on its inner circumference, said discontinuity being approximately seven degrees of arc, said third annulus having a stationary discontinuous conductive element that is relatively short with respect to the length of the other of said elements and which is partially axially aligned with the discontinuity in said conductive element on said second annulus, said discontinuous conductive element of said third annulus extending over approximately fourteen degrees of arc, a rotatable shaft disposed along the axis of said annuli, a plurality of electrically-interconnected, axially-aligned, conductive brushes, each contacting a different one of said elements, and means for securing said brushes to said shaft for rotating therewith, said relatively short conductive element of said third annulus being axially aligned relative to said discontinuity of said conductive element of said second annulus whereby their respective brushes contact one end of each substantially simultaneously enabling the brush contacting said discontinuous conductive element of said second annulus to contact said discontinuity substantially only during the initial half of when the brush contacting the relatively short conductive element is in contact therewith.

3. A variable electrical resistance mechanism comprising a first, a second and a third non-conductive annulus all of approximately the same diameter, means for maintaining said annuli in fixed positions relative to one another along a common axis, said first annulus having a discontinuous resistive material on its inner circumference, said second annulus having a stationary discontinuous conductive material on its inner circumference, said third annulus having a stationary discontinuous conductive material that is relatively short with respect to the length of the other of said materials and which is partially axially aligned with the discontinuity in said conductive material on said second annulus, a rotatable shaft disposed along the axis of said annuli, a resilient conductive member having at least three aligned fingers depending therefrom and means for securing said resilient conductive member to said shaft with said fingers each contacting a different one of said materials, said conductive material of said third annulus and the discontinuity of said resistive element extending over approximately fourteen degrees of arc, and the discontinuity of the conductive material on said second annulus extending over approximately seven degrees of arc, said fixed positions of said annuli being such that the centers of arc of said discontinuities and the center of arc of said conductive material of said third annulus are contacted simultaneously by said aligned fingers, said first relatively short conductive element of said third annulus being axially aligned relative to said discontinuity of said conductive element of said second annulus whereby their respective brushes contact one end of each substantially simultaneously enabling the brush contacting said discontinuous conductive element of said second annulus to contact said discontinuity substantially only during the initial half of when the brush contacting the relatively short conductive element is in contact therewith.

4. A variable electrical resistance mechanism comprising a first, a second and a third non-conductive annulus all of approximately the same diameter, means for maintaining said annuli in fixed positions relative to one another along a common axis, said first annulus having a discontinuous resistive material on its inner circumference, a stationary conductive material on the inner circumference of said second annulus and having a discontinuity subtending a predetermined angle, a stationary conductive material on said third annulus having one end substantially axially aligned with one end of, and subtending an angle somewhat larger than the angle subtended by, the discontinuity in the material on said second annulus, a rotatable shaft disposed along the axis of said annuli, a plurality of electrically-interconnected, axially aligned, conductive brushes, each contacting a different one of said materials, and means for securing said brushes to said shaft for rotating therewith, and means for connecting the conductive material of the third annulus and the adjacent ends of the discontinuous resistive material to enable selective phasing of the signals which can be provided by said mechanism.

References Cited in the file of this patent

UNITED STATES PATENTS

| | | |
|---|---|---|
| 2,561,140 | Schaefer | July 17, 1951 |
| 2,572,545 | Walker | Oct. 23, 1951 |
| 2,848,629 | Adise | Aug. 19, 1958 |